United States Patent Office 3,078,299
Patented Feb. 19, 1963

3,078,299
PREPARATION OF PHENYL BENZOATE AND CONVERSION THEREOF TO PHENOL
Edward J. McNelis, Media, Pa., assignor to Sun Oil Company, Philadelphia, Pa., a corporation of New Jersey
No Drawing. Filed Apr. 13, 1961, Ser. No. 102,632
12 Claims. (Cl. 260—476)

This invention relates to the preparation of phenyl benzoate by the pyrolysis of alkali metal o-halobenzoates together with alkali metal benzoates. The invention further embraces the use of the phenyl benzoate as an intermediate in the preparation of phenol.

In one aspect the invention concerns the preparation of phenyl benzoate which is a useful chemical intermediate particularly for making phenol. The method of preparing the phenyl ester comprises heating an alkali metal o-chlorobenzoate or o-bromobenzoate salt with an alkali metal benzoate. The alkali metal in either of the two components of the starting mixture can be sodium, potassium, rubidium or cesium and the phenyl ester of benzoic acid surprisingly will be obtained as the major product and regardless of the choice of alkali metal. For the reaction to proceed as desired, the halobenzoate component in the starting mixture must have chlorine or bromine at the ortho position. The temperature for carrying out the reaction is in the range of 250–375° C. and more preferably 300–340° C. Xanthone is also formed as a minor product of the reaction.

In another aspect of the invention the reaction described above is first carried out to form the phenyl benzoate ester. The ester is then subjected to hydrolysis and phenol is separated from the reaction mixture as a desired product of the process. Xanthone can also be obtained as a side product in minor amount. The procedure results in the regeneration from the phenyl ester of a considerable proportion of either benzoic acid or its alkali metal salt which can be recycled to the first step of the process.

The principal reactions involved in the process can be depicted by the following equations, assuming that the alkali metal is potassium and the halogen is bromine:

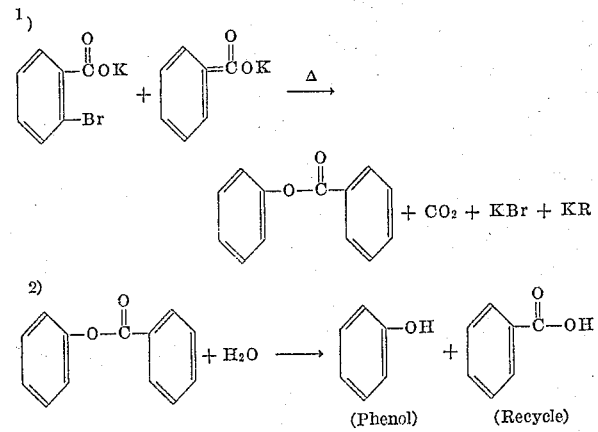

(Phenol)      (Recycle)

Considering Equation 1, it can be seen that the pyrolysis at 250–375° C. of a mixture consisting of potassium o-bromobenzoate together with potassium benzoate causes the release of carbon dioxide and potassium bromide and results in formation of the phenyl ester of benzoic acid. The mechanism of this reaction is not known with certainty at present. However it is believed that part of the potassium is converted to some form of organo potassium compound, which has been depicted in Equation 1 as KR. If the reaction product is hydrolyzed as described below, this organo potassium compound is converted to benzoic acid and/or o-bromobenzoic acid which can be re-used in the process. Hence the organic portion represented by the symbol R does not constitute a waste product of the process.

The pyrolysis step preferably is carried out at about atmospheric pressure and in a manner to exclude air and moisture from the reaction mixture while permitting escape of the released carbon dioxide. For obtaining the ester in substantial yield, stoichiometric proportions of the reactants need not be used; and in fact the molar ratio of the potassium benzoate to the bromo salt can vary widely, for example, from 1:5 to 10:1. It is preferable, however, to use a molar ratio of these components substantially in excess of 1:1, for the reason that the bromo salt tends to react with itself on pyrolysis to form xanthone. Hence the use of an excess of potassium benzoate over the bromo salt tends to suppress the xanthone reaction and thus increase the conversion of the bromo salt to the desired phenyl ester. The time of heating the reaction mixture will vary depending mainly upon the temperature used but generally will be in the range of 0.1–2.0 hours.

Equation 2 represents a simplification of the hydrolysis step whereby the phenyl benzoate is converted in part to phenol, which can be removed as a desired product of the process, and in part to benzoic acid which can be recycled to the first step. Various procedures can be utilized to effect these results and they generally involve several steps rather than a single step as might seem to be indicated by Equation 2. One suitable procedure for hydrolyzing the phenyl ester and working up the reaction product is described below.

The product mixture from the reaction depicted by Equation 1 generally contains, in addition to the phenyl ester, KBr and KR, some amounts of unreacted benzoate salts as well as xanthone resulting from the reaction of the bromine-containing salt with itself. One suitable procedure for processing this mixture involves mixing and heating it at a temperature of 60–100° C. with an aqueous solution of strong alkali (e.g. NaOH) which has a pH above 11. Initially the phenyl ester and xanthone will form a phase separate from the aqueous phase which contains the KBr and KR. As the heating is continued, the ester will hydrolyze and sodium phenolate and sodium benzoate will be formed. Each of the latter will dissolve in the aqueous phase, while the xanthone will remain undissolved. When the hydrolysis is complete, which may require several hours, the heating is discontinued and the mixture is allowed to separate into layers. The xanthone layer then can be separated from the aqueous layer. If desired, the aqueous layer can be extracted with a suitable solvent such as benzene or toluene to insure removal of the xanthone.

The aqueous layer from which the xanthone has been separated is next treated with a suitable amount of mineral acid such that it remains only slightly alkaline (e.g. pH=8). This releases the phenol but leaves the sodium benzoate unconverted. The mixture is steam distilled to remove the phenol and the residue is then strongly acidified. This converts the sodium benzoate to benzoic acid which is substantially insoluble in water and accordingly precipitates. The procedure also converts KR and unreacted starting materials to benzoic acid and/or o-bromobenzoic acid which also precipitate. The recovered precipitated acids can then be converted to the potassium salts which can be recycled to the first step of the process.

The following example is illustrative of the invention.

*Example*

A mixture of potassium o-bromobenzoate (2.39 g.) and potassium benzoate (0.40 g.) was prepared such that the molar ratio of the bromo salt to the non-bromo salt was about 4:1. The mixture was placed in a glass tube which had been purged with nitrogen and the tube was heated while the nitrogen purge was continued. The maximum temperature that the reaction mixture reached during heating was 322° C. and the total time above 300° C. was 7 minutes. The pyrolysis product was extracted with chloroform to separate the organic product from metalloorganic and inorganic components, and the chloroform was then evaporated from the organic product. The residue was dissolved in petroleum ether and the resulting solution was passed through a chromatographic column containing alumina. A fraction of effluent obtained from the column was found upon evaporation of the petroleum ether to contain 0.350 g. of phenyl benzoate which was identified by its infrared spectrum and its melting point of 70° C. Hydrolysis of this ester produced phenol and benzoic acid. The yield of ester in this fraction, based on the maximum theoretical yield obtainable from the quantity of potassium benzoate used, was about 70%. Another fraction of effluent obtained from the column was shown to contain xanthone in a yield of about 16% based on the potassium o-bromobenzoate used.

When chlorine is substituted for bromine as the halogen in the starting o-halobenzoate component, results analogous to those shown in the preceding example are obtained. The same is true when sodium, rubidium and cesium are substituted as the alkali metal of either the o-halobenzoate salt or the alkali metal benzoate.

The xanthone obtained as by-product of the present process is useful in the preparation of perfumes, pharmaceuticals, larvacides and dyes.

I claim:

1. Method of preparing phenol which comprises heating an alkali metal salt of an o-halobenzoic acid, wherein the alkali metal is selected from the group consisting of sodium, potassium, rubidium and cesium and the halogen is selected from the group consisting of chlorine and bromine, to a temperature in the range of 250 to 375° C. in the presence of a reactant amount of an alkali metal benzoate in which the alkali metal is selected from the group consisting of sodium, potassium, rubidium and cesium, whereby phenyl benzoate is formed, hydrolyzing the phenyl benzoate and separating phenol from the hydrolysis product.

2. Method according to claim 1 wherein said temperature is in the range of 300–340° C.

3. Method according to claim 1 wherein the halogen is bromine.

4. Method according to claim 1 wherein the halogen is chlorine.

5. Method according to claim 1 wherein the alkali metal in said salt and in the alkali metal benzoate is potassium.

6. Method according to claim 1 wherein potassium o-bromobenzoate and potassium benzoate are heated to a temperature in the range of 300–340° C.

7. Method of preparing phenyl benzoate which comprises heating an alkali metal salt of an o-halobenzoic acid, wherein the alkali metal is selected from the group consisting of sodium, potassium, rubidium and cesium and the halogen is selected from the group consisting of chlorine and bromine, to a temperature in the range of 250 to 375° C. in the presence of a reactant amount of an alkali metal benzoate in which the alkali metal is selected from the group consisting of sodium, potassium, rubidium and cesium.

8. Method according to claim 7 wherein said temperature is in the range of 300–340° C.

9. Method according to claim 7 wherein the halogen is bromine.

10. Method according to claim 7 wherein the halogen is chlorine.

11. Method according to claim 7 wherein the alkali metal in said salt and in the alkali metal benzoate is potassium.

12. Method according to claim 7 wherein potassium o-bromobenzoate and potassium benzoate are heated to a temperature in the range of 300–340° C.

References Cited in the file of this patent

UNITED STATES PATENTS 2,762,838    Toland _____ Sept. 11, 1956